(12) United States Patent  (10) Patent No.: US 8,585,374 B2
Beers et al.  (45) Date of Patent: Nov. 19, 2013

(54) FAN MOTOR COOLING WITH PRIMARY AND SECONDARY AIR COOLING PATHS

(75) Inventors: Craig M. Beers, Wethersfield, CT (US); Harold W. Hipsky, Willington, CT (US); Brent J. Merritt, Southwick, MA (US); Darryl A. Colson, West Suffield, CT (US); Roberto J. Perez, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 24 days.

(21) Appl. No.: 13/185,457

(22) Filed: Jul. 18, 2011

(65) Prior Publication Data

US 2013/0022443 A1 Jan. 24, 2013

(51) Int. Cl.
 *F04D 29/58* (2006.01)
(52) U.S. Cl.
 USPC ........... 417/368; 417/423.8; 310/58; 415/180
(58) Field of Classification Search
 USPC ......... 417/368, 369, 370, 366, 423.8; 310/58; 415/177, 180, 116
 See application file for complete search history.

(56) References Cited

U.S. PATENT DOCUMENTS

| | | | | |
|---|---|---|---|---|
| 2,294,586 A * | 9/1942 | Troller | | 417/368 |
| 2,397,171 A * | 3/1946 | Troller et al. | | 417/368 |
| 2,475,560 A * | 7/1949 | Brown | | 310/62 |
| 3,734,649 A | 5/1973 | Sandy, Jr. | | |
| 5,350,281 A * | 9/1994 | Hagshenas | | 417/371 |
| 5,925,947 A * | 7/1999 | Kajiwara et al. | | 310/64 |
| 5,967,764 A | 10/1999 | Booth et al. | | |
| 6,700,235 B1 * | 3/2004 | McAfee | | 310/52 |
| 7,342,332 B2 * | 3/2008 | McAuliffe et al. | | 310/58 |
| 7,394,175 B2 * | 7/2008 | McAuliffe et al. | | 310/58 |
| 7,625,173 B2 | 12/2009 | Mehring | | |
| 7,628,586 B2 | 12/2009 | Feher | | |
| 7,644,792 B2 | 1/2010 | Telakowski | | |
| 7,748,950 B2 | 7/2010 | Kodama et al. | | |
| 7,757,502 B2 * | 7/2010 | Merritt et al. | | 62/172 |
| 7,819,641 B2 * | 10/2010 | Decker et al. | | 417/370 |
| 8,459,966 B2 * | 6/2013 | Hipsky et al. | | 417/369 |
| 2004/0261428 A1 * | 12/2004 | Murry et al. | | 62/86 |
| 2006/0061221 A1 * | 3/2006 | McAuliffe et al. | | 310/59 |
| 2006/0061222 A1 * | 3/2006 | McAuliffe et al. | | 310/60 R |
| 2008/0302880 A1 | 12/2008 | Enbank et al. | | |
| 2009/0311095 A1 | 12/2009 | Blewett et al. | | |
| 2012/0011878 A1 * | 1/2012 | Hipsky | | 62/401 |
| 2012/0014784 A1 * | 1/2012 | Hipsky et al. | | 415/177 |
| 2012/0156009 A1 * | 6/2012 | Colson et al. | | 415/170.1 |

* cited by examiner

*Primary Examiner* — Devon Kramer
*Assistant Examiner* — Nathan Zollinger
(74) *Attorney, Agent, or Firm* — Carlson, Gaskey & Olds P.C.

(57) ABSTRACT

An example fan assembly impeller moves air along a secondary flow path when driven by a motor. The motor also drives a fan rotor to move air along a primary flow path of the fan assembly. Air moving along the primary flow path moves in a first direction. Air moving along the secondary flow path moves in a second direction opposite the first direction. An example fan shroud communicates air used to cool a motor into a primary flow path of a fan assembly. The shroud communicates the air into the primary flow path so that the flow of air is at least partially aligned with air moving through the primary flow path of the fan assembly.

15 Claims, 3 Drawing Sheets

US 8,585,374 B2

FAN MOTOR COOLING WITH PRIMARY AND SECONDARY AIR COOLING PATHS

BACKGROUND

This disclosure relates generally to cooling a component of a fan and, more particularly, to cooling a fan motor.

Fans are often used to move air. Fans may, for example, move air through heat exchangers of air conditioning packs on aircraft. The air moved by the fans cools the heat exchangers. Such fans within aircraft are often ram air fans. When the aircraft is stationary, motors are typically used to rotate the rotors of the ram air fans. Thermal energy can buildup within components of fans and cause damage as is known. Motors of ram air fans are particularly prone to such thermal energy build-up.

Some prior art ram air fan designs rely on a radial blower to pull a flow of cooling air through the motor. The radial blower redirects air that has been used to cool the engine radially away from a rotational axis of the fan and into a primary flow path of air through the ram air fan. The flow from the radial blower distorts flow of air along the primary flow path, which makes the ram air fan less efficient. The radial blower is inefficient and is also heavy.

SUMMARY

An example fan assembly impeller moves air along a secondary flow path when driven by a motor. The motor also drives a fan rotor to move air along a primary flow path of the fan assembly. Air moving along the primary flow path moves in a first direction. Air moving along the secondary flow path moves in a second direction opposite the first direction.

An example fan shroud communicates air used to cool a motor into a primary flow path of a fan assembly. The shroud communicates the air into the primary flow path so that the flow of air is at least partially aligned with air moving through the primary flow path of the fan assembly.

An example fan assembly includes a fan rotor that is rotatable about an axis. The fan assembly also includes an impeller and a motor positioned axially between the fan and the rotor. The motor rotatable drives the impeller and the fan rotor. The fan rotor moves air from the fan rotor axially toward the impeller along a primary flow path. The impeller moves air from the impeller axially toward the fan rotor along a secondary flow path. A flow directing shroud defines an annular channel that directs air from the secondary flow path into the primary flow path.

An example method of cooling a motor of a fan assembly includes rotating a fan rotor with a motor, and also rotating an impeller with the motor. The method moves air through the motor using the impeller. The motor is located axially between the fan rotor and the impeller.

BRIEF DESCRIPTION OF THE DRAWINGS

The various features and advantages of the disclosed examples will become apparent to those skilled in the art from the detailed description. The figures that accompany the detailed description can be briefly described as follows.

DETAILED DESCRIPTION

Figure 1:
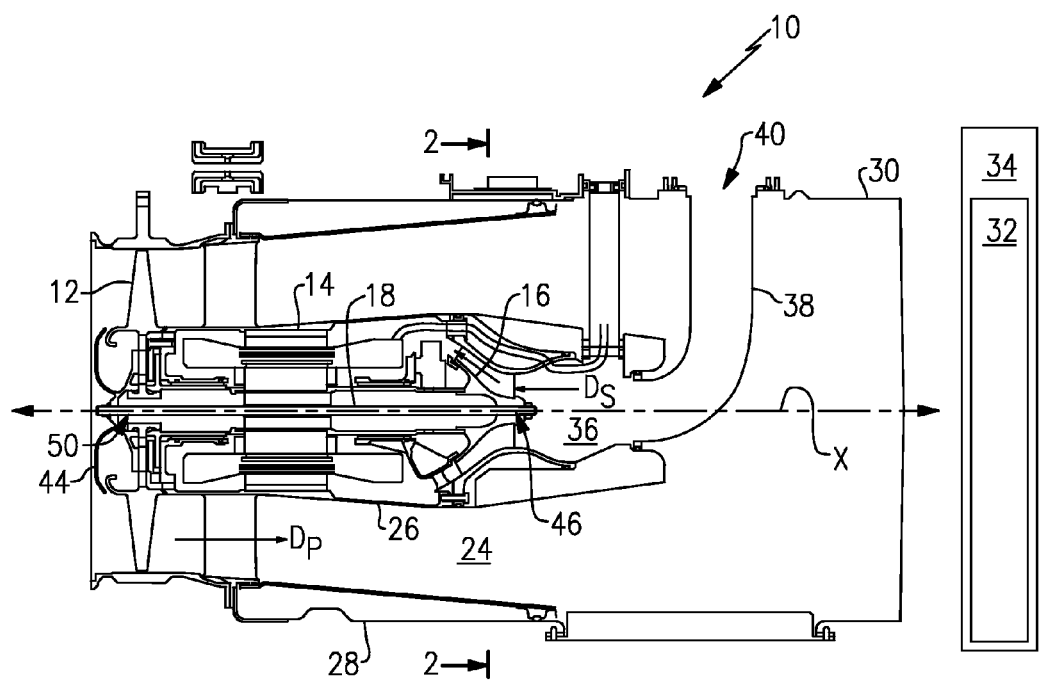
FIG. 1 shows a section view of an example fan assembly.
Figure 2:
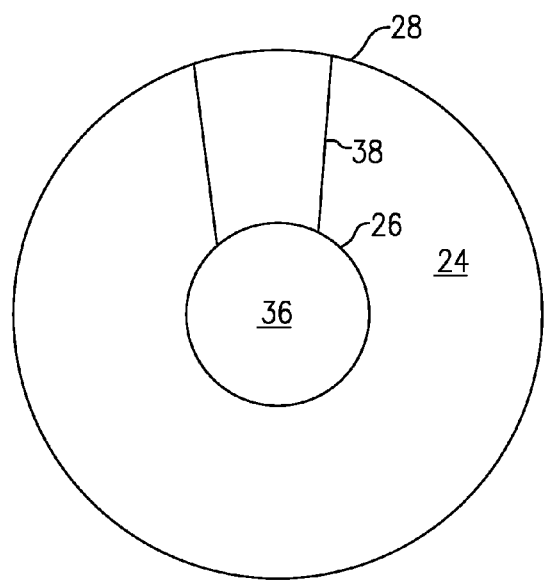
FIG. 2 shows a simplified section view of the FIG. 1 fan assembly at line 2-2 in FIG. 1.

Referring to FIGS. 1 and 2, an example fan assembly 10 includes a fan rotor 12, a motor 14, and an impeller 16. The motor 14 rotates a shaft 18 about an axis X to rotate the fan rotor 12 and the impeller 16.

The fan assembly 10 includes a primary flow path 24 bounded by a radially inner housing 26 and a radially outer housing 28. The primary flow path 24 is an annular flow path.

The example fan assembly 10 is a ram air fan assembly. Rotating the fan rotor 12 draws air into the primary flow path 24 of the fan assembly 10. The air moves through the primary flow path 24 from the fan rotor 12 toward the impeller 16 in a direction $D_p$. Air moving through the primary flow path 24 is exhausted from the fan assembly 10 at an exhaust section 30. The exhausted air cools heat exchangers 32 of aircraft air conditioning packs 34, for example.

The fan assembly 10 includes a secondary flow path 36 established radially inside the inner housing 26 of the fan assembly 10. A cooling inlet duct 38 extends radially from the secondary flow path 36 across the primary flow path 24. The cooling inlet duct 38 communicates air to the secondary flow path 36. The cooling inlet duct 38 forms a portion of the secondary flow path 36 in some examples.

Rotating the impeller 16 draws air through an inlet 40 and into the secondary flow path 36. Air moves along the secondary flow path 36 in a direction $D_s$. Air moving along the secondary flow path 36 moves through the motor 14 and carries thermal energy away from the motor 14.

A shroud 44 receives air that has been communicated along the secondary flow path 36 through the motor 14. The shroud 44 communicates the received air into the primary flow path. Notably, the direction $D_s$ is opposite the direction $D_p$.

Figure 3:
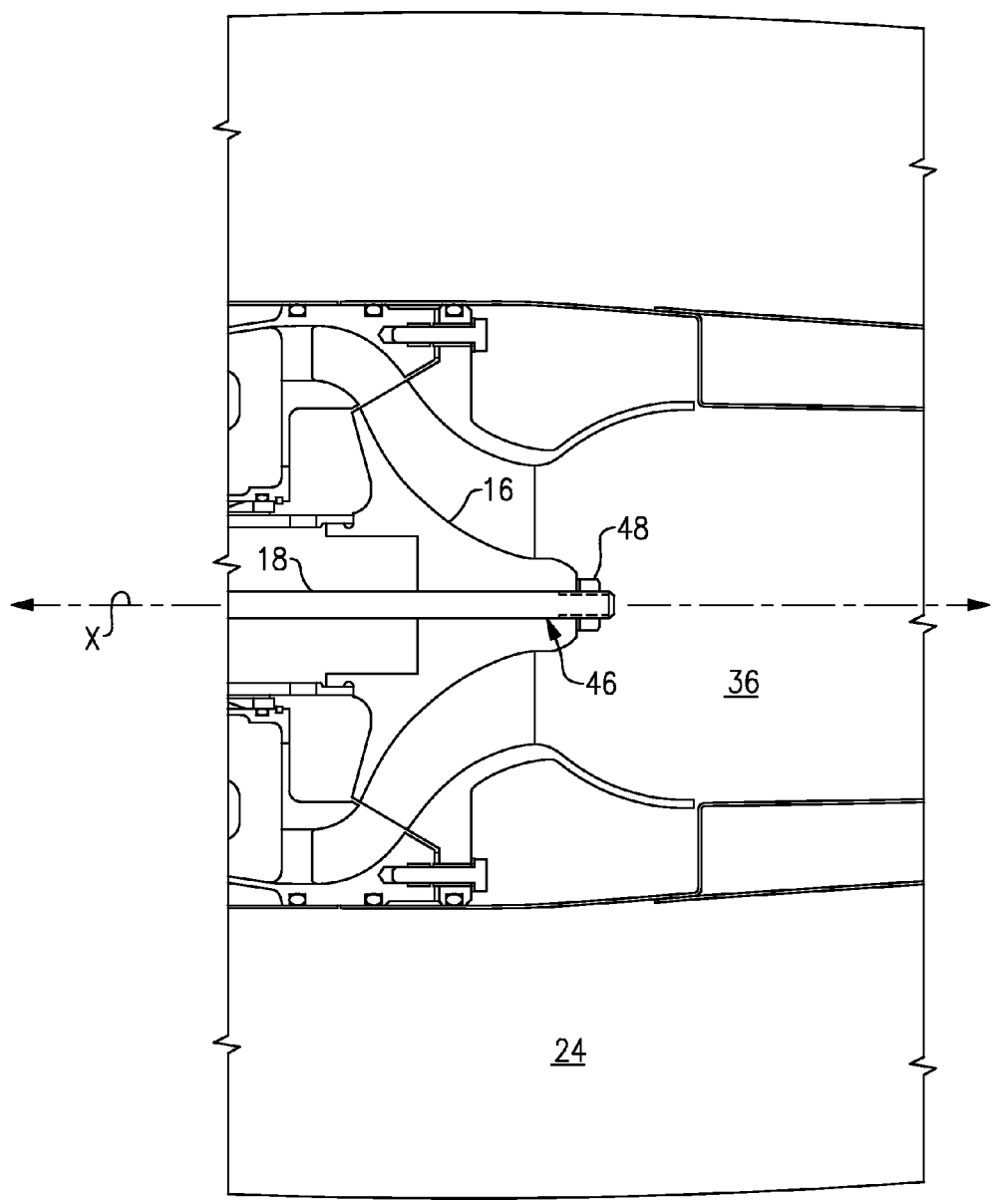
FIG. 3 shows a close-up view of an impeller within the FIG. 1 fan assembly.
Figure 4:
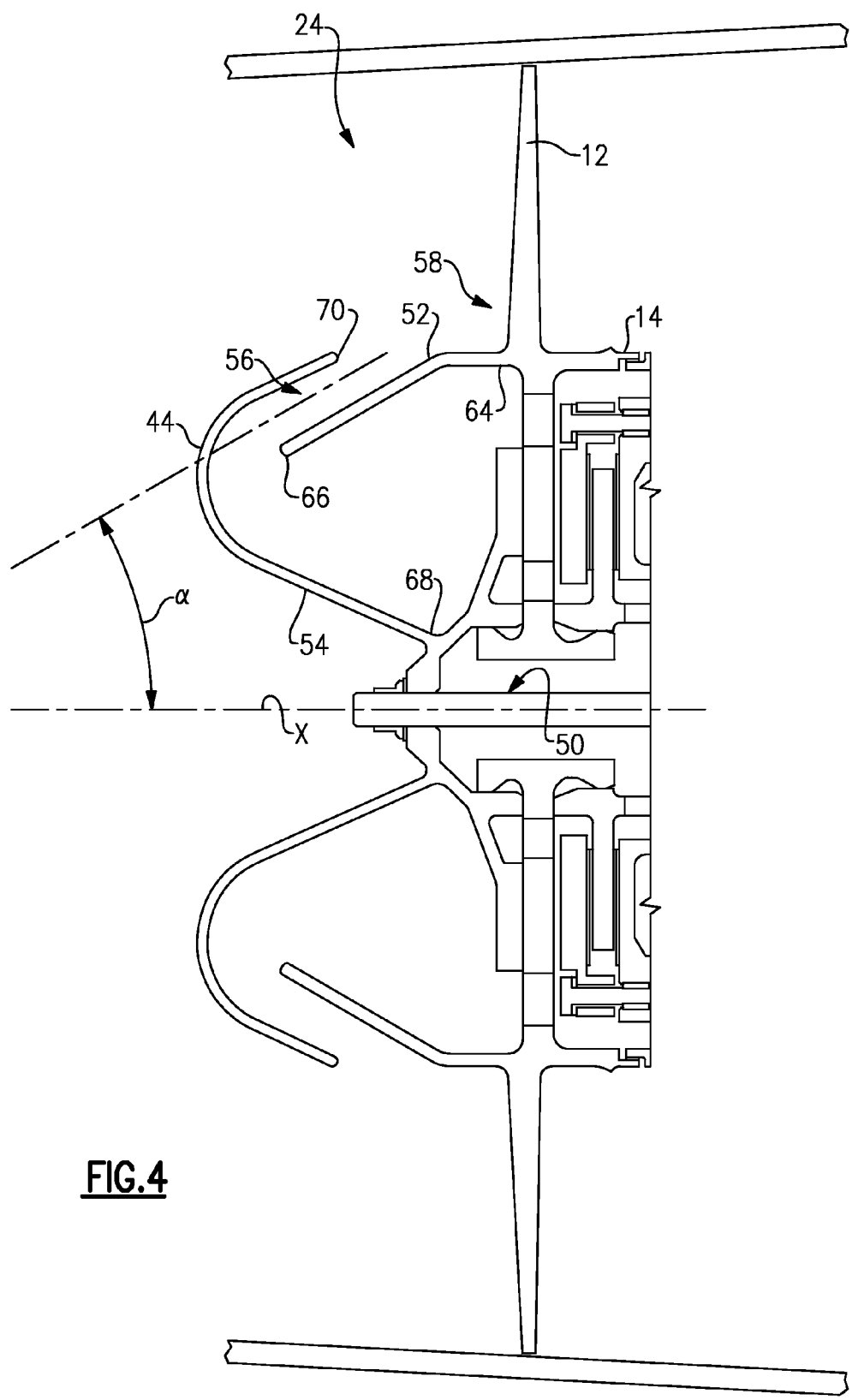
FIG. 4 shows a close-up view of a shroud within the FIG. 1 fan assembly.

Referring to FIGS. 3 and 4 with continuing reference to FIGS. 1 and 2, the impeller 16 is connected directly to the shaft 18, which is also coupled to the fan rotor 12. Thus, whenever the motor 14 rotates the fan rotor 12, the motor 14 is also rotating the impeller 16 to draw a flow of cooling air through the motor 14.

In this example, the impeller 16 is mounted to a first axial end portion 46 of the shaft 18 and secured with a mechanical fastener 48, such as a nut. A person having skill in this art and the benefit of this disclosure would understand how to design an impeller suitable for moving air along a path when rotated.

The example fan rotor 12 is mounted to a second axial end portion 50 of the shaft 18. The shroud 44 of the example fan assembly 10 is upstream from the fan rotor 12 relative the direction $D_p$ of flow through the primary flow path 24.

The shroud 44 is configured to redirect air received from the motor 14. Notably, in this example, the shroud 44 redirects air moving in the direction $D_s$ so that the air at least partially moves in the direction $D_p$. The shroud 44 thus does not communicate air directly into the primary flow path 24 in an exclusively radial direction.

The example shroud 44 includes a first flange 52 and a second flange 54 that establish an annular channel 56 used to redirect air that has been communicated along the secondary flow path 36 into the primary flow path 24. The annular channel 56 is tilted relative to the axis of the fan assembly 10 at an angle α, which is less than 90 degrees in this example. The annular channel 56 is thus at least partially axially aligned with the primary flow path 24.

The shroud 44, and particularly the annular channel 56, directs air at a radially inner base 58 of the fan rotor 12.

Introducing flow in a direction having at least some axial component helps lessen distortion of air entering the fan assembly 10.

The first flange 52 extends from a first flange base 64 to a first flange tip 66. The second flange 54 extends from a second flange base 68 to a second flange tip 70. As can be appreciated, the first flange base 64 is radially outside the second flange base 68, and the first flange tip 66 is radially inside the second flange tip 70.

In this example, the first flange 52 and the second flange 54 generally extend axially away from the motor 14. That is, the first flange base 64 is axially closer to the motor 14 than the first flange tip 66. Similarly, the second flange base 68 is axially closer to the motor 14 than the second flange tip 70. In other examples, other configurations of flanges may be used.

Features of the disclosed examples include moving air through a motor of a fan assembly using an impeller. The air cools the motor. Another feature of this invention includes directing air that has moved through the motor into a primary flow path of a fan. The air is directed in an at least partially axial direction to lessen disturbances and turbulence of air entering the fan assembly.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A fan assembly impeller, comprising:
an impeller that moves air along a secondary flow path when driven by a motor, the motor also driving a fan rotor to move air along a primary flow path different than the secondary flow path, air moving along the secondary flow path is drawn from a source that is different than air moving along the primary flow path, wherein air moving along the primary flow path moves in a first direction, and air moving along the secondary flow path moves in a second direction opposite the first direction, the impeller and the fan rotor on opposing sides of the motor, wherein a portion of the primary flow path and a portion of the secondary flow path are axially aligned with the motor; wherein the impeller forms a portion of a ram air fan assembly.

2. The fan assembly impeller of claim 1, wherein at least a portion of the secondary flow path is defined by the motor, and air moving along the secondary path removes thermal energy from the motor.

3. The fan assembly impeller of claim 1, wherein the secondary flow path is radially inside the primary flow path.

4. The fan assembly impeller of claim 1, wherein the primary flow path is an annular flow path.

5. The fan assembly impeller of claim 1, wherein the impeller is downstream from the motor relative a direction of flow along the primary flow path.

6. The fan assembly impeller of claim 1, wherein the primary flow path extends axially from the fan rotor of a fan assembly to an exhaust section of the fan assembly, and the secondary flow path extends axially from the impeller to the fan rotor of the fan assembly.

7. The fan assembly impeller of claim 6, wherein air moving along the secondary flow path is communicated to the secondary flow path through a radially extending duct.

8. The fan assembly impeller of claim 1, wherein a portion of the primary flow path and a portion of the secondary flow path are axially aligned with the impeller.

9. The fan assembly impeller of claim 1, wherein the primary flow path and the secondary flow path are axially aligned.

10. The fan assembly impeller of claim 1, wherein the primary flow path is an annular flow path axially aligned with the secondary flow path.

11. The fan assembly of claim 1, including a radially outer housing providing an outer boundary of the primary flow path along the entire length of the primary flow path.

12. The fan assembly of claim 1, wherein a secondary flow path supply extends radially from the secondary flow path across the primary flow path.

13. A ram air fan assembly, comprising:
a primary flow path and a secondary flow path of a ram air fan, the secondary flow path bounded radially by the primary flow path;
a fan rotor configured to move air along the primary flow path in a first direction; and
a mixed flow impeller configured to move air along the secondary flow path in a second direction, opposite the first direction to cool a motor of the ram air fan;
wherein a secondary flow path supply extends radially from the secondary flow path across the primary flow path.

14. The ram air fan assembly of claim 13, including a radially outer housing providing an outer boundary of the primary flow path.

15. The ram air fan assembly of claim 13, wherein the motor is configured to rotatably drive both the fan rotor and the mixed flow impeller.

\* \* \* \* \*